United States Patent
Ibuki

(10) Patent No.: US 9,523,331 B2
(45) Date of Patent: Dec. 20, 2016

(54) CONTROL DEVICE FOR TURBOCHARGED DIESEL ENGINE

(75) Inventor: Taku Ibuki, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 71 days.

(21) Appl. No.: 14/353,602

(22) PCT Filed: Nov. 4, 2011

(86) PCT No.: PCT/JP2011/075479
§ 371 (c)(1),
(2), (4) Date: Apr. 23, 2014

(87) PCT Pub. No.: WO2013/065186
PCT Pub. Date: May 10, 2013

(65) Prior Publication Data
US 2014/0283514 A1  Sep. 25, 2014

(51) Int. Cl.
| | | |
|---|---|---|
| *F02B 33/44* | (2006.01) | |
| *F02M 25/07* | (2006.01) | |
| *F02D 23/02* | (2006.01) | |
| *F02D 41/10* | (2006.01) | |
| *F02D 41/14* | (2006.01) | |
| *F02D 41/00* | (2006.01) | |
| *F02D 41/24* | (2006.01) | |
| *F02D 41/18* | (2006.01) | |

(52) U.S. Cl.
CPC .......... *F02M 25/0704* (2013.01); *F02D 23/02* (2013.01); *F02D 41/0007* (2013.01); *F02D 41/107* (2013.01); *F02D 41/1401* (2013.01); *F02D 41/1448* (2013.01); *F02D 41/2422* (2013.01); *F02M 26/02* (2016.02); *F02D 41/005* (2013.01); *F02D 41/0052* (2013.01); *F02D 41/0055* (2013.01); *F02D 41/18* (2013.01); *F02D 2200/0406* (2013.01); *F02D 2200/0614* (2013.01); *F02D 2200/101* (2013.01); *F02D 2200/602* (2013.01); *F02D 2250/38* (2013.01); *Y02T 10/144* (2013.01)

(58) Field of Classification Search
CPC ............ F02M 25/0704; F02M 25/0707; F02M 25/0713; F02M 25/0718; F02M 25/0728; F02D 23/00; F02D 23/02; F02D 41/0007; F02D 41/0047; F02D 41/0052
USPC ...................... 60/602, 605.1, 605.2; 701/108
See application file for complete search history.

(56) References Cited

U.S. PATENT DOCUMENTS

| | | | | |
|---|---|---|---|---|
| 2005/0114011 | A1* | 5/2005 | Itoyama | F02D 23/02 701/108 |
| 2005/0178123 | A1* | 8/2005 | Uchiyama | F02D 41/0007 60/605.2 |
| 2011/0113773 | A1 | 5/2011 | Liu et al. | |

FOREIGN PATENT DOCUMENTS

| | | |
|---|---|---|
| JP | 2005-256755 A | 9/2005 |
| JP | 2010-185415 A | 8/2010 |

* cited by examiner

Primary Examiner — Nicholas J Weiss
Assistant Examiner — Jason T Newton
(74) Attorney, Agent, or Firm — Andrews Kurth Kenyon LLP

(57) ABSTRACT

A control device for calculating a steady target value that is a target value of a supercharging pressure during steady operation on the basis of an engine rotation speed and a fuel injection amount in a turbocharged diesel engine. The control device operates the actuator through feedback control such that an actual supercharging pressure calculated from a signal of a supercharging pressure sensor follows the steady target value.

2 Claims, 10 Drawing Sheets

F I G . 1
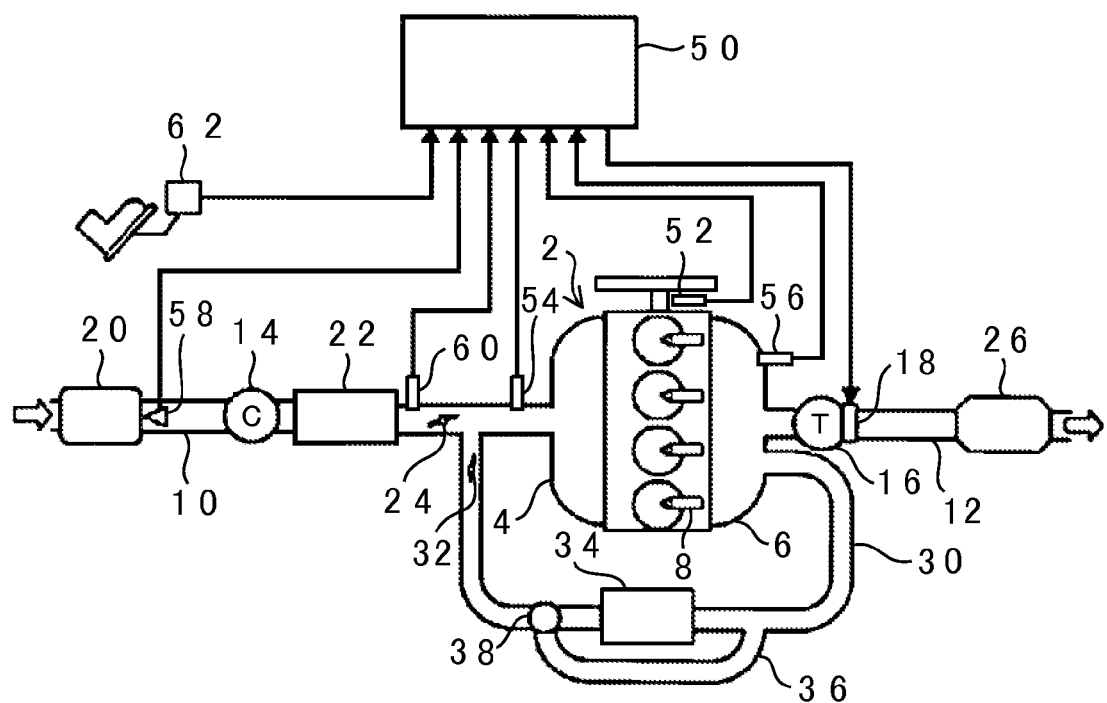

FIG.8

|  | ACCELERATION dqfin/dt | | | |
| --- | --- | --- | --- | --- |
|  | a~b | b~0 | 0~c | c~d |
| PRIORITY HIGH | k1 | k1 | k1 | k1 |
|  | k2 | k3 | k2 | k2 |
| LOW | k3 | k2 | k3 | k3 |

CONTROL DEVICE FOR TURBOCHARGED DIESEL ENGINE

CROSS-REFERENCE TO RELATED APPLICATIONS

This is a national phase application based on the PCT International Patent Application No. PCT/JP2011/075479 filed on Nov. 4, 2011, the entire contents of which are incorporated herein by reference.

TECHNICAL FIELD

The invention relates to a control device for a turbocharged diesel engine for an automobile and, more particularly, to a control device for a turbocharged diesel engine of which a supercharging pressure is actively controllable through control over a turbine rotation speed with the use of an actuator.

BACKGROUND ART

In a diesel engine with a variable displacement turbocharger having a variable nozzle, a supercharging pressure is actively controllable by controlling a turbine rotation speed through an opening degree of the variable nozzle. Therefore, in the thus configured turbocharged diesel engine, a target supercharging pressure is determined on the basis of an engine rotation speed and a fuel injection amount, and the variable nozzle is operated through feedback control such that an actual supercharging pressure that is calculated from a signal of a supercharging pressure sensor becomes the target supercharging pressure.

Incidentally, in control over the turbocharged diesel engine, there are various constraints on hardware or control, associated with an operation amount of the actuator and a state quantity of the engine. When those constraints are not satisfied, there is a possibility of a breakage of hardware or a decrease in control performance. At least part of those constraints are associated with supercharging pressure control, so the target supercharging pressure that is used in the feedback control is set to a value that satisfies those constraints and the response of the engine at the same time.

However, adaptation work for setting the target supercharging pressure for each engine rotation speed and each fuel injection amount is generally carried out under steady operation of the engine. When transitional operation in which the engine rotation speed is increasing is also included, man-hours required for adaptation work are enormous. It is also difficult to adapt the target supercharging pressure without omission on the assumption of all the transitional operation conditions. Therefore, when the engine is in transitional operation, there is a possibility that part of constraints associated with supercharging pressure control are not satisfied. One of such constraints is a constraint associated with a reliability guarantee on hardware. A difference between the target supercharging pressure and the actual supercharging pressure increases during transitional operation, so the opening degree of the variable nozzle is changed such that the actual supercharging pressure is increased by increasing the turbine rotation speed as soon as possible. At this time, an exhaust pressure rapidly increases with a steep change in the opening degree of the variable nozzle, so there is a possibility of a breakage of hardware if the exhaust pressure excessively increases.

A document that discloses the invention having an object of a reliability guarantee on hardware may be Japanese Patent Application Publication No. 2010-185415 (JP 2010-185415 A). In this publication, there is disclosed the invention of supercharging pressure control that is allowed to avoid an overshoot of a supercharging pressure, which can occur during acceleration, in the configuration that controls the opening degree of a variable nozzle through open-loop control. According to the invention disclosed in this publication, during steady operation, a target intake air amount is calculated on the basis of an engine rotation speed and a fuel injection amount, and the target opening degree of the variable nozzle is determined on the basis of the target intake air amount. On the other hand, during acceleration, a target intake air amount deviation is calculated on the basis of a deviation between a target supercharging pressure and an actual supercharging pressure, and the sum of the target intake air amount deviation and the intake air amount is calculated as a supercharger controlling target intake air amount. A target opening degree of the variable nozzle is determined on the basis of the supercharger controlling intake air amount.

However, constraints that may not be satisfied during transitional operation are not only a constraint associated with a reliability guarantee on hardware. The constraints about supercharging pressure control also include a constraint associated with intake sound, a constraint associated with the controllability of an EGR rate, and the like, and those also may not be satisfied during transitional operation. Speaking of intake sound, there is a possibility of occurrence of a large intake sound that reaches occupant's ears due to a steep change in supercharging pressure. Speaking of the controllability of the EGR rate, there is a possibility of a decrease in the controllability of the EGR rate due to an excessively small differential pressure between the exhaust pressure and the supercharging pressure. In this, way, various constraints associated with supercharging pressure control may not be satisfied during transitional operation; however, the invention disclosed in the above publication just satisfies part of the constraints, and no measures are taken against problems associated with the other constraints.

As is apparent from the above, when feedback control over the supercharging pressure is executed with the use of the variable nozzle, it is necessary to take some measures for satisfying various constraints associated with supercharging pressure control even under transitional operation. In those measures, of course, adaptation work that requires enormous man-hours is made unnecessary or the man-hours are desired to be reduced as much as possible if adaptation work is necessary. Because a supercharging pressure control state that can be taken at one time, more specifically, the opening degree of the variable nozzle, which can be taken at one time, is only one, it is not always possible to satisfy all the constraints at the same time. Thus, when there are a plurality of constraints to be satisfied, it is an important object to determine which constraint is given a priority.

RELATED ART DOCUMENT

Patent Document

Patent Document 1: Japanese Patent Application Publication No. 2010-185415 (JP 2010-185415 A)

SUMMARY OF THE INVENTION

It is an object of the invention to make it possible to satisfy various constraints associated with supercharging pressure control during transitional operation in a turbocharged diesel engine of which a supercharging pressure is actively controllable through operation of an actuator. In order to achieve the object, a control device for a turbocharged diesel engine according to the invention is configured to carry out the following operation.

According to one aspect of the invention, the control device calculates an actual supercharging pressure of the engine from a signal of a supercharging pressure sensor and calculates a target value (hereinafter, steady target value) of the supercharging pressure during steady operation on the basis of an engine rotation speed and a fuel injection amount. The actuator for supercharging pressure control is operated through feedback control such that the actual supercharging pressure is brought close to the steady target value. The actuator for supercharging pressure control includes a variable nozzle for a variable displacement turbocharger and a waistgate valve. The above operation that is executed by the control device is an operation that is carried out irrespective of during steady operation or during transitional operation. However, when the transitional target value described below is selected, the control device changes the target value of feedback control from the steady target value to the selected transitional target value.

When any condition of a plurality of different conditions, which can be satisfied during transitional operation, is satisfied, the control device calculates a target value (hereinafter, transitional target value) of the supercharging pressure, suitable for the satisfied condition in accordance with a calculation rule prepared for each condition. Each condition is associated with any one of constraints associated with supercharging pressure control. Thus, the above plurality of conditions, for example, include a condition associated with an exhaust pressure and an exhaust pressure change rate, a condition associated with a supercharging pressure change rate, a condition associated with a differential pressure between an exhaust pressure and a supercharging pressure, and the like. The control device determines a priority order among the plurality of conditions on the basis of a value of a predetermined physical quantity associated with an acceleration. When there is one transitional target value, the transitional target value is selected, and, when there are a plurality of transitional target values at the same time, one of the transitional target values is selected in accordance with the priority order.

Because the control device operates as described above, in a situation that any one of constraints associated with supercharging pressure control is not satisfied, the target value of feedback control is changed to the transitional target value that satisfies the constraint. In a situation that a plurality of constraints associated with the supercharging pressure control are not satisfied, the target value of feedback control is changed to the transitional target value that satisfies the constraint having a higher priority. Because the priority order among the constraints is changed on the basis of the acceleration, optimal supercharging pressure control based on a transitional situation is achieved. With the control device, it is not necessary to carry out adaptation work of enormous man-hours for each transitional operation condition in the process of creating the control program, so the functions of feedback control are not complicated.

BRIEF DESCRIPTION OF THE DRAWINGS

FIG. 1 is a block diagram that shows the configuration of an engine system according to an embodiment of the invention.

FIG. 8 is a view that shows an example of a table for determining the priority level of each transitional target value on the basis of an acceleration.

MODES FOR CARRYING OUT THE INVENTION

Figure 2:
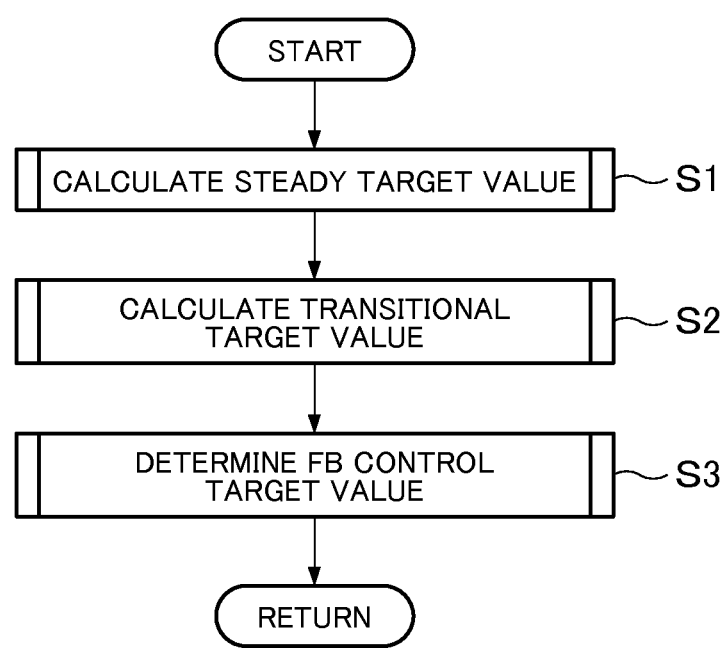
FIG. 2 is a flowchart that shows a routine for supercharging pressure control that is executed by a control device according to the embodiment of the invention.

An embodiment of the invention will be described with reference to the drawings.

FIG. 1 is a view that shows the configuration of an engine system according to the embodiment of the invention. An engine according to the present embodiment is a turbocharged diesel engine (hereinafter, simply referred to as engine). Four cylinders are provided in line in a body 2 of the engine, and injectors 8 are provided cylinder by cylinder. An intake manifold 4 and an exhaust manifold 6 are connected to the engine body 2. An intake passage 10 is connected to the intake manifold 4. Fresh air taken in from an air cleaner 20 flows through the intake passage 10. A compressor 14 of the turbocharger is installed in the intake passage 10. A diesel throttle 24 is provided in the intake passage 10 at a portion downstream of the compressor 14. An intercooler 22 is provided in the intake passage 10 between the compressor 14 and the diesel throttle 24. An exhaust passage 12 is connected to the exhaust manifold 6. The exhaust passage 12 is used to release exhaust gas, emitted from the engine body 2, into the atmosphere. A turbine 16 of the turbocharger is installed in the exhaust passage 12. The turbocharger according to the present embodiment is of a variable displacement type, and a variable nozzle 18 is provided at the turbine 16. A catalyst device 26 is provided in the exhaust passage 12 at a portion downstream of the turbine 16. The catalyst device 26 is used to purify exhaust gas.

The engine according to the present embodiment includes an EGR device that recirculates exhaust gas from an exhaust system to an intake system. The EGR device connects a location downstream of the diesel throttle 24 in the intake passage 10 to the exhaust manifold 6 via an EGR passage 30. An EGR valve 32 is provided in the EGR passage 30. An EGR cooler 34 is provided in the EGR passage 30 on an exhaust side of the EGR valve 32. A bypass passage 36 is provided in the EGR passage 30. The bypass passage 36 bypasses the EGR cooler 34. A bypass valve 38 is provided at a portion at which the EGR passage 30 and the bypass passage 36 meet. The bypass valve 38 changes the direction in which exhaust gas flows.

The engine system according to the present embodiment includes an ECU (electronic control unit) 50. The ECU 50 is a control device that executes integrated control over the whole engine system. The ECU 50 executes the process of acquiring signals of sensors provided in the engine system. The sensors are installed at portions of the engine system. For example, an air flow meter 58 is installed in the intake passage 10 at a portion downstream of the air cleaner 20, an intake air temperature sensor 60 is installed near an outlet of the intercooler 22 in the intake passage 10, and a supercharging pressure sensor 54 is installed in the intake passage 10 at a portion downstream of the diesel throttle. An exhaust pressure sensor 56 is installed in the exhaust manifold 6. In addition, a rotation speed sensor 52 that detects the rotation of a crankshaft, an accelerator operation amount sensor 62 that outputs a signal corresponding to an operation amount of an accelerator pedal, and the like, are also installed. The ECU 50 operates actuators in accordance with a predetermined control program by processing the acquired signals of the sensors. The actuators that are operated by the ECU 50 include the variable nozzle 18, the injectors 8, the EGR valve 32, the diesel throttle 24, and the like. There are a large number of actuators and sensors connected to the ECU 50, other than the actuators and sensors shown in the drawing; however, the description thereof is omitted in the specification.

Engine control that is executed by the ECU 50 includes supercharging pressure control and EGR control. In the supercharging pressure control according to the present embodiment, the variable nozzle 18 is operated through feedback control such that an actual supercharging pressure calculated from the signal of the supercharging pressure sensor 54 becomes a target supercharging pressure. In the EGR control, the EGR valve 32 is operated through feedback control such that an actual EGR rate calculated from the signals of the various sensors becomes a target EGR rate. Between these engine controls, particularly characterized one in the present embodiment is the supercharging pressure control. However, in carrying out the invention, there are no limitations on a specific method for feedback control in the supercharging pressure control. In the present embodiment, it is assumed that PID control based on a difference between an actual value and a target value is executed in both the supercharging pressure control and the EGR control. The supercharging pressure control that is executed in the present embodiment has a feature in a method of determining the target supercharging pressure. Hereinafter, this will be described with reference to a flowchart.

The flowchart shown in FIG. 2 shows a routine for the supercharging pressure control that is executed by the ECU 50 in the present embodiment. In this routine, the EGR control is also executed. The routine of the supercharging pressure control is formed of step S1 of calculating a steady target value, step S2 of calculating a transitional target value, and step S3 of determining a target value that is finally used in feedback control (FB control target value). A sub-routine (described later) is executed in each step.

Figure 3:
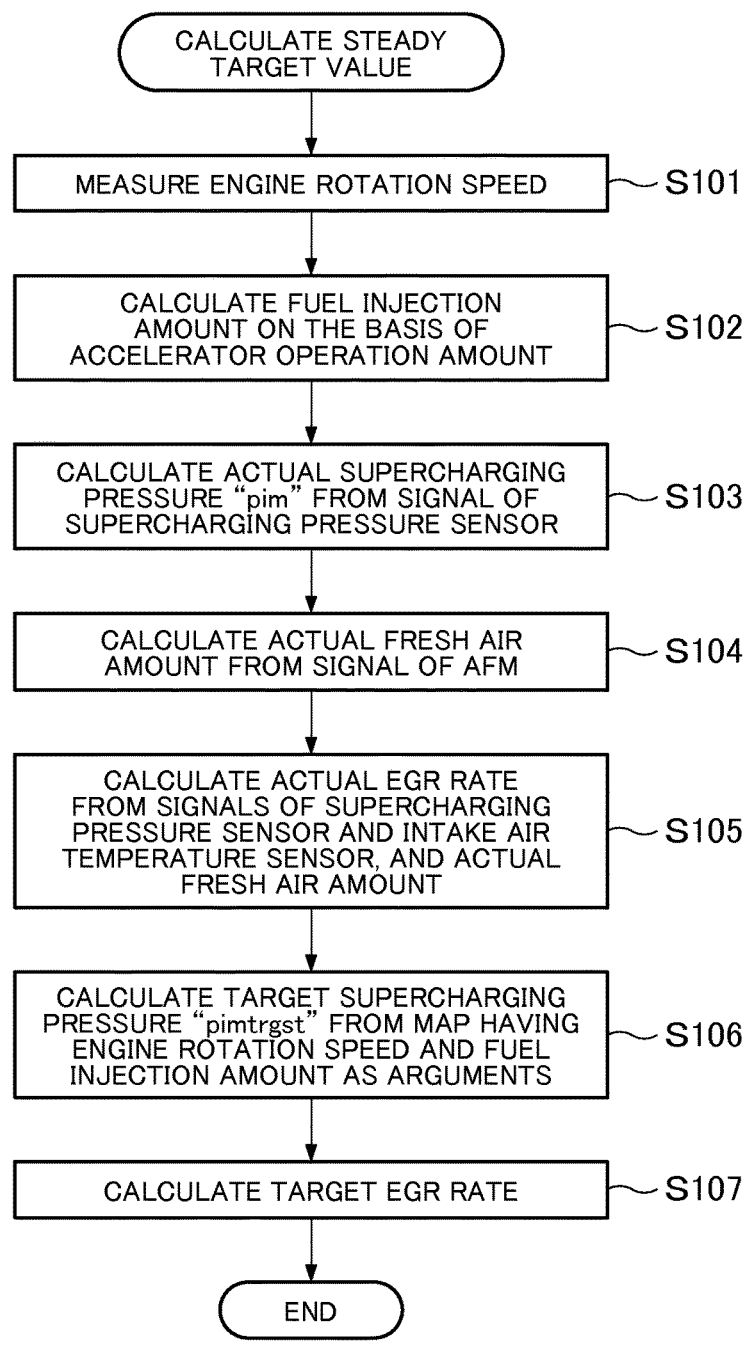
FIG. 3 is a flowchart that shows a routine for calculating a steady target value, which is executed by the control device according to the embodiment of the invention.

The flowchart shown in FIG. 3 shows a sub-routine that is executed in step S1 of the supercharging pressure control routine. In this sub-routine, steady target values are respectively calculated for the supercharging pressure and the EGR rate. The steady target values mean target values that are determined by using data that are adapted under steady operation of the engine.

In step S101 of this sub-routine, an engine rotation speed is measured from the signal of the rotation speed sensor 52. In step S102, a fuel injection amount is calculated on the basis of an accelerator operation amount obtained from the signal of the accelerator operation amount sensor 62. In step S103, an actual supercharging pressure is calculated from the signal of the supercharging pressure sensor 54. In the following description, the actual supercharging pressure may be denoted by "pim". In step S104, an actual fresh air amount is calculated from the signal of the air flow meter 58. The actual fresh air amount is the amount of fresh air that is actually taken into the cylinders. In step S105, an actual EGR rate is calculated from the signals of the supercharging pressure sensor 54 and intake air temperature sensor 60, and the actual fresh air amount. The processes of the above steps are processes for obtaining data required to calculate the steady target values. Thus, the sequence of the steps may be changed as needed.

Calculation of the steady target values is carried out in step S106 and step S107. In step S106, a target supercharging pressure is calculated from a map having the engine rotation speed and the fuel injection amount as arguments. The target supercharging pressure calculated in this step is a target value adapted under steady operation of the engine, that is, the steady target value of the supercharging pressure. The map that is used to calculate the steady target value is generated on the basis of adapted data obtained through a test under steady operation while the engine rotation speed and the fuel injection amount each are varied in constant values. In the following description, the steady target value of the supercharging pressure may be denoted by "pimtrgst". In step S107, a target EGR rate is calculated on the basis of the fresh air amount. The correlation between the fresh air amount and the target EGR rate is determined such that the oxygen concentration of air that is taken into the cylinders becomes an intended value within the range in which the EGR rate does not exceed a limit at or below which smoke is not generated. The target EGR rate that is calculated in this step is a target value adapted under steady operation of the engine, that is, a steady target value of the EGR rate. Both a value that achieves an intended intake air oxygen concentration and a value that becomes a smoke limit may be calculated, and a smaller one of the values may be set for the target EGR rate.

Figure 4:
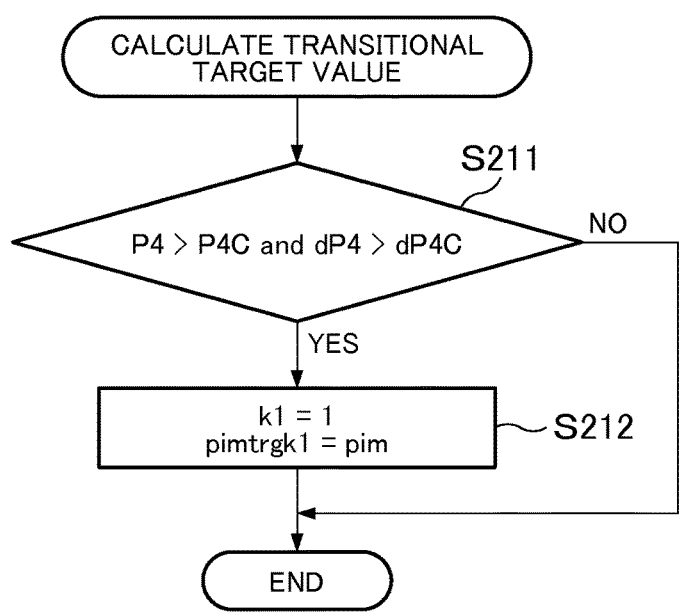
FIG. 4 is a flowchart that shows a routine for calculating a transitional target value that satisfies a constraint associated with a reliability guarantee on hardware, which is executed by the control device according to the embodiment of the invention.
Figure 5:
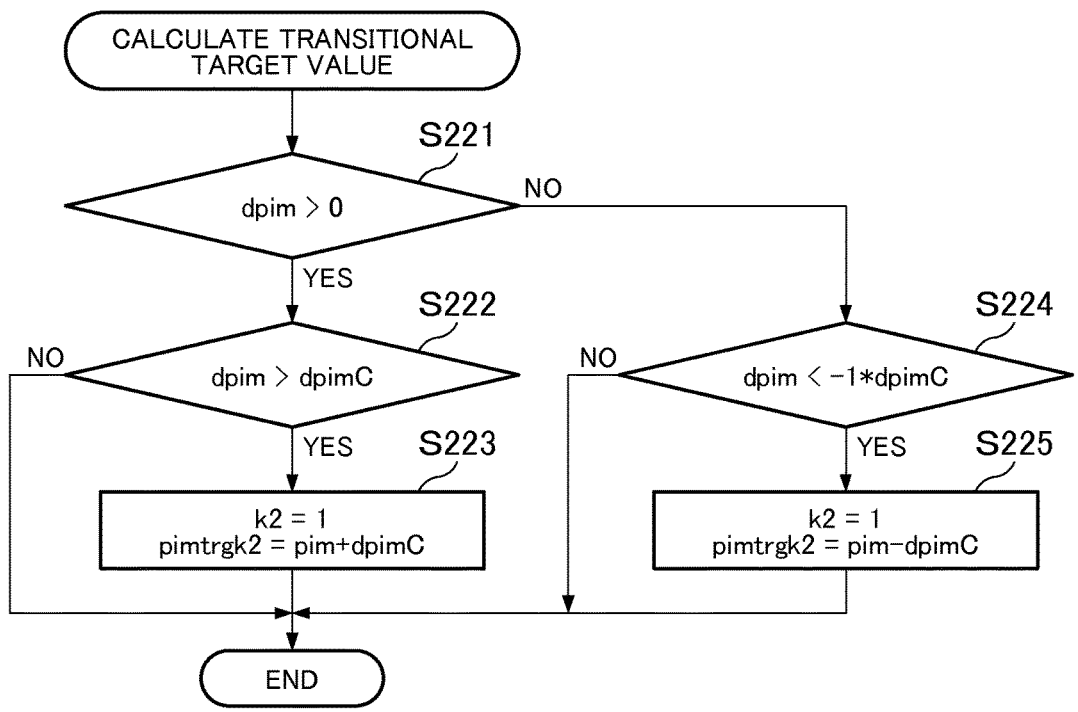
FIG. 5 is a flowchart that shows a routine for calculating a transitional target value that satisfies a constraint associated with intake sound, which is executed by the control device according to the embodiment of the invention.
Figure 6:
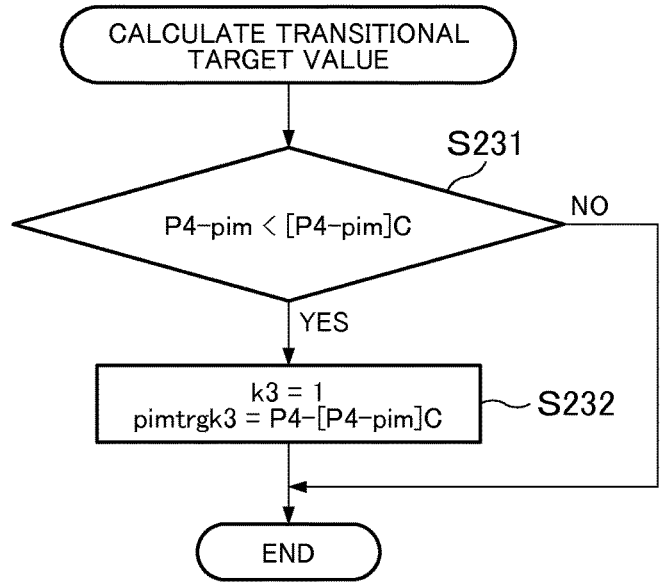
FIG. 6 is a flowchart that shows a routine for calculating a transitional target value that satisfies a constraint associated with the controllability of an EGR rate, which is executed by the control device according to the embodiment of the invention.

In step S2 of the supercharging pressure control routine, sub-routines shown in the flowcharts of FIG. 4, FIG. 5 and FIG. 6 are executed. The sub-routines may be executed sequentially in a predetermined sequence or may be executed in parallel with one another. In these sub-routines, transitional target values of the supercharging pressure are calculated. The transitional target values each are a target value that is set only when a predetermined condition that may be satisfied during transitional operation of the engine is satisfied. The steady target value of the supercharging pressure, which is calculated in step S1 of the supercharging pressure control routine, is predicated on the case where the engine is in steady operation. Therefore, during steady operation, such as during acceleration and during deceleration, some constraints associated with the supercharging pressure control may not be satisfied. In the supercharging pressure control according to the present embodiment, a particular matter of concern is constituted of a constraint associated with a reliability guarantee on hardware, a constraint associated with intake sound and a constraint associated with the controllability of the EGR rate. The sub-routines for calculating the transitional target values are generated in one-to-one correspondence with these constraints. In each sub-routine, the fact that the constraint is not satisfied is predicted on the basis of whether a predetermined condition is satisfied. Only when the fact that the constraint is not satisfied is predicted, a target value of the supercharging pressure, which reliably satisfies the constraint, is calculated as the transitional target value.

The sub-routine shown in FIG. 4 is a sub-routine for calculating a transitional target value that satisfies the constraint associated with a reliability guarantee on hardware. The constraint associated with a reliability guarantee on hardware is specifically a constraint for preventing a breakage of the exhaust system, which occurs because of an excessive exhaust pressure. In step S211 of this sub-routine, it is determined whether a condition regarding an exhaust pressure and an exhaust pressure change rate is satisfied. The condition is that an actual exhaust pressure "P4" measured by the exhaust pressure sensor 56 is higher than a predetermined exhaust pressure reference "P4C" and a rate of change "dP4" in actual exhaust pressure is larger than a predetermined exhaust pressure change rate reference "dP4C". The exhaust pressure reference "P4C" is set to a value lower than a design limit at or below which the reliability of the hardware of the exhaust system is guaranteed. The exhaust pressure change rate reference "dP4C" is determined on the basis of an allowance of the exhaust pressure reference "P4C" for the reliability guarantee limit and the response speed of the supercharging pressure control. When the allowance of the exhaust pressure reference "P4C" for the reliability guarantee limit increases, the value of the exhaust pressure change rate reference "dP4C" is allowed to be increased. However, as the exhaust pressure reference "P4C" is set to a value close to the reliability guarantee limit, the exhaust pressure change rate reference "dP4C" is required to be a smaller value. When the condition of step S211 is satisfied, it is predicted that the exhaust pressure exceeds the reliability guarantee limit in the near future. When the condition of step S211 is satisfied, the process of step S212 is executed. In step S212, the value "pim" of the actual supercharging pressure, calculated from the signal of the supercharging pressure sensor 54, is set as the transitional target value "pimtrgk1" of the supercharging pressure such that the current supercharging pressure is kept as it is. The value of a flag k1 that indicates that the transitional target value for a reliability guarantee on hardware is set to "1".

The sub-routine shown in FIG. 5 is a sub-routine for calculating a transitional target value that satisfies the constraint associated with intake sound. The constraint associated with intake sound is specifically a constraint for preventing occurrence of intake sound with a steep change in supercharging pressure. In step S221 of this sub-routine, it is determined whether a rate of change "dpim" in the supercharging pressure measured by the supercharging pressure sensor 54 is a positive value. The rate of change in the supercharging pressure here means a variation amount in the supercharging pressure per time step (for example, a control interval of the engine) of the supercharging pressure control. When the supercharging pressure change rate "dpim" is a positive value, the engine is in an acceleration state; whereas, when the supercharging pressure change rate "dpim" is a negative value, the engine is in a deceleration state. When the supercharging pressure change rate "dpim" is a positive value, it is determined in step S222 whether the supercharging pressure change rate "dpim" is larger than a predetermined supercharging pressure change rate reference "dpimC". The supercharging pressure change rate reference "dpimC" is set to a value that is a positive value and that is smaller than a limit value of the supercharging pressure change rate, at or above which intake sound is generated. That is, the supercharging pressure change rate reference "dpimC" is set to a value at which no generation of intake sound is guaranteed. Thus, when the supercharging pressure change rate "dpim" is larger than the supercharging pressure change rate reference "dpimC", it is predicted that the supercharging pressure change rate exceeds the intake sound generation limit in the near future. When the condition of step S222 is satisfied, the process of step S223 is executed. In step S223, a value obtained by adding the supercharging pressure change rate reference "dpimC" to the value "pim" of the actual supercharging pressure, calculated from the signal of the supercharging pressure sensor 54, is set for a transitional target value "pimtrgk2" of the supercharging pressure. The value of a flag k2 that indicates that the transitional target value for preventing generation of intake sound is set is set to "1". On the other hand, as a result of determination of step S221, when the supercharging pressure change rate "dpim" is a negative value, it is determined in step S224 whether the supercharging pressure change rate "dpim" is smaller than a value obtained by multiplying the supercharging pressure change rate reference "dpimC" by "−1". When the condition of step S224 is satisfied, the process of step S225 is executed. In step S225, a value obtained by subtracting the supercharging pressure change rate reference "dpimC" from the value "pim" of the actual supercharging pressure, calculated from the signal of the supercharging pressure sensor 54, is set for the transitional target value "pimtrgk2" of the supercharging pressure. The value of the flag k2 that indicates that the transitional target value for preventing generation of intake sound is set is set to "1".

The sub-routine shown in FIG. 6 is a sub-routine for calculating a transitional target value that satisfies a constraint associated with the controllability of the EGR rate. The constraint associated with the controllability of the EGR rate is specifically a constraint for guaranteeing the controllability of the EGR rate by sufficiently ensuring a differential pressure between the exhaust pressure and the supercharging pressure. In step S231 of this sub-routine, a differential pressure between the actual exhaust pressure "P4" calculated from the signal of the exhaust pressure sensor 56 and the actual supercharging pressure "pim" calculated from the signal of the supercharging pressure sensor 54 is calculated. It is determined whether the differential pressure is lower than a predetermined differential pressure reference "[P4-pim]C". A sufficient differential pressure between the actual exhaust pressure "P4" and the actual supercharging pressure "pim" is an important requirement in the EGR control. In the EGR control, the opening degree of the EGR valve 32 is changed through feedback control such that the actual EGR rate becomes the target EGR rate; however, when there is not a sufficient differential pressure between the front and rear sides of the EGR valve 32, it is not possible to control the EGR rate no matter how the EGR valve 32 is operated. The above differential pressure reference "[P4−pim]C" is a positive value and is set to a value of the differential pressure at which the controllability of the EGR rate by the EGR valve 32 is guaranteed. Thus, when the differential pressure between the actual exhaust pressure "P4" and the actual supercharging pressure "pim" is smaller than "[P4−pim]C", there is a possibility that it is not possible to ensure a sufficient differential pressure for guaranteeing the controllability of the EGR rate. When the condition of step S231 is satisfied, the process of step S232 is executed. In step S232, a value obtained by subtracting the differential pressure reference "[P4−pim]C" from the actual exhaust pressure "P4" calculated from the signal of the exhaust pressure sensor 56 is set for a transitional target value "pimtrgk3" of the supercharging pressure. The value of a flag k3 that indicates that the transitional target value for guaranteeing the controllability of the EGR rate is set is set to "1".

Next, the sub-routine that is executed in step S3 of the supercharging pressure control routine will be described. Depending on the operating state of the engine during transitional operation, a plurality of constraints associated with supercharging pressure control may not be satisfied at the same time. In such a case, in the above step S2, a transitional target value is set for each constraint that may not be satisfied. Incidentally, it is not possible to completely achieve all the plurality of transitional target values at the same time. Therefore, the process of selecting one transitional target value from among the plurality of transitional target values, that is, coordination of the transitional target values, is required. In this coordination process, it is determined which constraint is given a higher priority under current transitional operation, and the transitional target value that satisfies the constraint to be given a higher priority is selected. A physical quantity associated with an acceleration is used as information that indicates a transitional situation. The acceleration is information that indicates how much the current operating state deviates from steady operation. The physical quantity associated with the acceleration may be an acceleration in itself. The acceleration may be calculated from a vehicle speed or an engine rotation speed or may be directly measured by an acceleration sensor. However, a preferred physical quantity associated with the acceleration is a variation amount in the fuel injection amount per small time, that is, a rate of change in the fuel injection amount. When the rate of change in the fuel injection amount is a positive value, the engine rotation speed increases with an increase in combustion energy, and the vehicle accelerates. On the other hand, when the rate of change in the fuel injection amount is a negative value, the engine rotation speed decreases with a reduction in combustion energy, and the vehicle decelerates. That is, it is possible to predict an acceleration in the future from the rate of change in the fuel injection amount. When the priority order among the constraints is determined on the basis of the rate of change in the fuel injection amount, it is presumable that optimal supercharging pressure control is executed in response to the current transitional situation without a delay in a variation in transitional situation.

Figure 7:
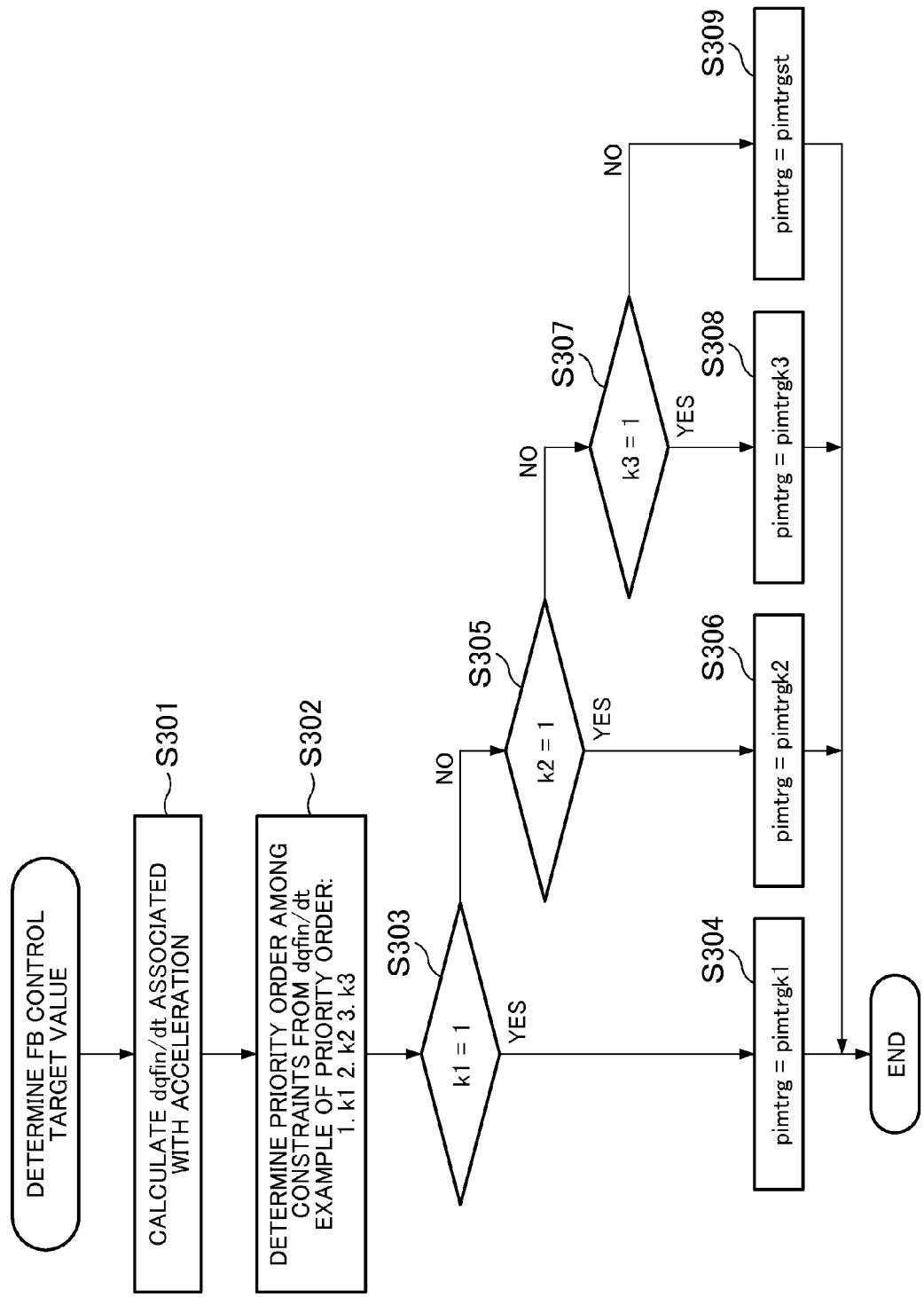
FIG. 7 is a flowchart that shows a routine for determining a target value of feedback control, which is executed by the control device according to the embodiment of the invention.

The flowchart shown in FIG. 7 shows a sub-routine that is executed in step S3 of the supercharging pressure control routine. In the first step S301 of this sub-routine, a rate of change "dqfin/dt" in the fuel injection amount that is a physical quantity associated with the acceleration is calculated. A fuel injection amount "qfin" is calculated from the accelerator operation amount in step S102 of the sub-routine shown in FIG. 3. In the next step S302, the priority order among the constraints is determined from the rate of change "dqfin/dt" in the fuel injection amount on the basis of a prepared priority order table. FIG. 8 shows an example of the priority order table. In this example, values of the rate of change "dqfin/dt" in the fuel injection amount are divided into four regions, and the priority order among the constraints is set region by region. For example, when the value of "dqfin/dt" falls within a deceleration region from b having a negative value to 0, the priority order is k1, k3, k2 in priority descending order. When the value of "dqfin/dt" falls within an acceleration region from 0 to c having a positive value, the priority order is k1, k2, k3 in priority descending order. k1 is a flag corresponding to the constraint associated with a reliability guarantee on hardware, k2 is a flag corresponding to the constraint associated with intake sound, and k3 is a flag corresponding to the constraint associated with the controllability of the EGR rate. In the following description, the priority order is in order of k1, k2, k3 as an example.

In step S303, it is determined whether the value of the flag corresponding to the constraint having the highest priority is set to "1". According to the priority order of the above example, it is determined whether the value of the flag k1 is set to "1" here. The fact that the value of the flag k1 is "1" means that the transitional target value for a reliability guarantee on hardware is set. Thus, when the value of the flag k1 is "1", the process of step S304 is selected. In step S304, the transitional target value "pimtrgk1" of the supercharging pressure, calculated in the sub-routine shown in FIG. 4, is determined as an FB control target value "pimtrg". Thus, a rapid increase in exhaust pressure during transitional operation is suppressed, and the reliability of the hardware of the exhaust system is guaranteed.

When the determination result of step S303 is negative, the process of step S305 is selected. In step S305, it is determined whether the value of the flag corresponding to the constraint having the second highest priority is set to "1". According to the priority order of the above example, it is determined whether the value of the flag k2 is set to "1" here. The fact that the value of the flag k2 is "1" means that the transitional target value for preventing generation of intake sound is set. Thus, when the value of the flag k2 is "1", the process of step S306 is selected. In step S306, the transitional target value "pimtrgk2" of the supercharging pressure, calculated in the sub-routine shown in FIG. 5, is determined as the FB control target value "pimtrg". Thus, a steep variation in the supercharging pressure during transitional operation is suppressed, and it is possible to prevent generation of intake sound that makes an occupant feel discomfort.

When the determination result of step S305 is negative, the process of step S307 is selected. In step S307, it is determined whether the value of the flag corresponding to the constraint having the third highest priority is set to "1". According to the priority order of the above example, it is determined whether the value of the flag k3 is set to "1" here. The fact that the value of the flag k3 is "1" means that the transitional target value for guaranteeing the controllability of the EGR rate is set. Thus, when the value of the flag k3 is "1", the process of step S308 is selected. In step S308, the transitional target value "pimtrgk3" of the supercharging pressure, calculated in the sub-routine shown in FIG. 6, is determined as the FB control target value "pimtrg". Thus, it is possible to prevent a decrease in the controllability of the EGR rate by sufficiently ensuring the differential pressure between the actual exhaust pressure and the actual supercharging pressure during transitional operation.

When the determination result of step S307 is negative, the process of step S309 is selected. In step S309, the steady target value "pimtrgst" of the supercharging pressure, calculated in the sub-routine shown in FIG. 3, is directly determined as the FB control target value "pimtrg". In this case, the variable nozzle is operated such that the actual supercharging pressure "pim" follows the steady target value "pimtrgst".

In a situation that any constraint associated with the supercharging pressure control is not satisfied when the above supercharging pressure control routine is executed by the ECU 50, the target value of feedback control is changed to the transitional target value that satisfies the constraint. In a situation that a plurality of constraints associated with the supercharging pressure control are not satisfied, the target value of feedback control is changed to the transitional target value that satisfies the constraint having a higher priority at the current level of acceleration. Hereinafter, for each of the transitional target values "pimtrgk1", "pimtrgk2", "pimtrgk3", the effect of the case where the transitional target value is selected as the target value of feedback control will be described with reference to the drawings.

Figure 9:
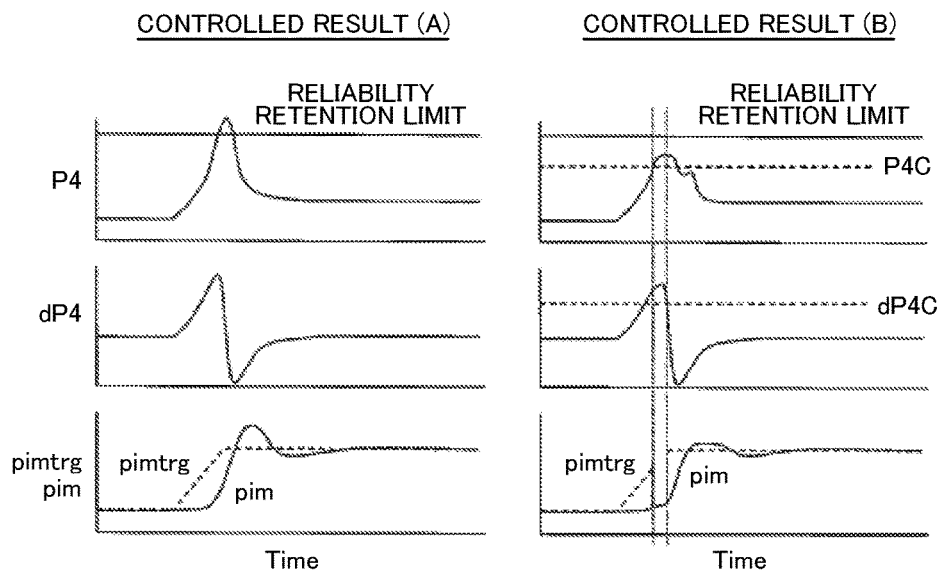
FIG. 9 is a view that shows results controlled by the control device according to the embodiment of the invention.

The effect in the case where the transitional target value "pimtrgk1" is determined as the FB control target value "pimtrg" can be described with reference to FIG. 9. FIG. 9 shows two controlled results for the supercharging pressure control during acceleration. The controlled result (A) is the result of the supercharging pressure control by constantly using only the steady target value, that is, the controlled result in the case where the transitional target value is not set. On the other hand, the controlled result (B) is the controlled result in the case where the transitional target value is set through the supercharging pressure control according to the present embodiment. The first chart from the top of each controlled result shows a temporal variation in exhaust pressure "P4". The second chart shows a temporal variation in exhaust pressure change rate "dP4". The third chart shows a temporal variation in the FB control target value "pimtrg" of the supercharging pressure and a temporal variation in the actual supercharging pressure "pim". The dashed line indicates a temporal variation in the FB control target value "pimtrg". The continuous line indicates a temporal variation in the actual supercharging pressure "pim".

Initially, when the controlled result (A) is observed, the exhaust pressure "P4" rapidly increases, and exceeds the reliability retention limit of the exhaust pressure although it is temporary. This is because the effect of an increase in the exhaust pressure due to an increase in the fuel injection amount and the effect of an increase in the exhaust pressure due to feedback control over the supercharging pressure overlap with each other. During acceleration, the fuel injection amount is increased by driver's depression of the accelerator pedal, and the exhaust pressure increases because of an increase in combustion energy. The steady target value of the supercharging pressure is also increased in response to an increase in the fuel injection amount during acceleration; however, the turbocharger entails a supercharging delay, so the difference between the FB control target value "pimtrg" and the actual supercharging pressure "pim" temporarily expands. Therefore, feedback control works such that the actual supercharging pressure "pim" is increased by increasing the turbine rotation speed as soon as possible, and the opening degree of the variable nozzle 18 is reduced. As a result, the exhaust pressure further increases.

In contrast to this, in the controlled result (B), while the actual exhaust pressure "P4" is higher than the exhaust pressure reference "P4C" and the actual exhaust pressure change rate "dP4" is larger than the exhaust pressure change rate reference "dP4C", the FB control target value "pimtrg" is changed to the same value as the actual supercharging pressure "pim". Thus, the variable nozzle 18 is operated so as to keep the current supercharging pressure, and an increase in the exhaust pressure due to feedback control over the supercharging pressure is suppressed. As a result, an overlap of the effect of an increase in the exhaust pressure due to feedback control over the supercharging pressure with the effect of an increase in the exhaust pressure due to an increase in the fuel injection amount is avoided, and the maximum value of the actual exhaust pressure "P4" is suppressed to a value lower than the reliability retention limit. After that, when the actual exhaust pressure "P4" becomes lower than the exhaust pressure reference "P4C" or, as shown in the drawing, the actual exhaust pressure change rate "dP4" becomes smaller than the exhaust pressure change rate reference "dP4C", the FB control target value "pimtrg" is changed again to the steady target value that is determined from the engine rotation speed and the fuel injection amount. At this timing, the peak of the effect of an increase in the exhaust pressure due to an increase in the fuel injection amount has been passed, so, even when the effect of an increase in the exhaust pressure due to feedback control over the supercharging pressure appears, the actual exhaust pressure "P4" does not significantly increase again. Thus, even during acceleration in which the exhaust pressure increases, the reliability of the hardware of the exhaust system is guaranteed.

Figure 10:
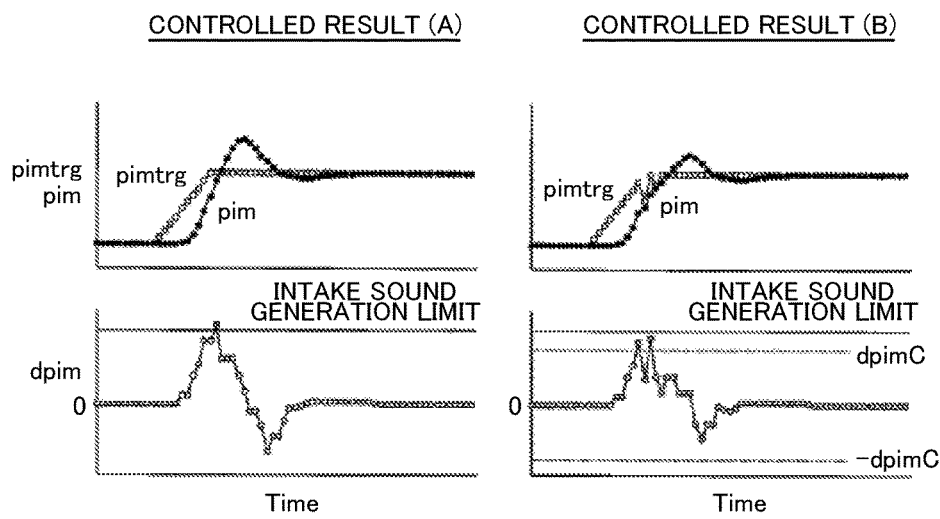
FIG. 10 is a view that shows results controlled by the control device according to the embodiment of the invention.

FIG. 10 is a view for illustrating the effect in the case where the transitional target value "pimtrgk2" is determined as the FB control target value "pimtrg". FIG. 10 shows two controlled results for supercharging pressure control during acceleration. The controlled result (A) is the result of the supercharging pressure control by constantly using only the steady target value, that is, the controlled result in the case where the transitional target value is not set. On the other hand, the controlled result (B) is the controlled result in the case where the transitional target value is set through the supercharging pressure control according to the present embodiment. The first chart from the top of each controlled result shows a temporal variation in the FB control target value "pimtrg" of the supercharging pressure and a temporal variation in the actual supercharging pressure "pim". Data indicated by the white circles in this chart each are a datum for each time step of the FB control target value "pimtrg", and data indicated by the black circles each are a datum for each time step of the actual supercharging pressure "pim". The second chart shows a datum for each time step of the supercharging pressure change rate "dpim" with the white circle.

In the controlled result (A), there occurs a situation that the supercharging pressure change rate "dpim" rapidly varies in the positive direction and exceeds the intake sound generation limit although it is temporary. This is because of the operation of feedback control over the supercharging pressure. During acceleration, the FB control target value "pimtrg" increases in response to an increase in the fuel injection amount. At this time, the difference between the FB control target value "pimtrg" and the actual supercharging pressure "pim" temporarily expands because of the supercharging delay of the turbocharger. The feedback control works so as to eliminate the difference, the turbine rotation speed is increased by reducing the opening degree of the variable nozzle 18, and, by extension, the actual supercharging pressure "pim" is rapidly increased. As a result, there occurs a situation that the supercharging pressure change rate "dpim" increases and exceeds the intake sound generation limit.

Figure 11:
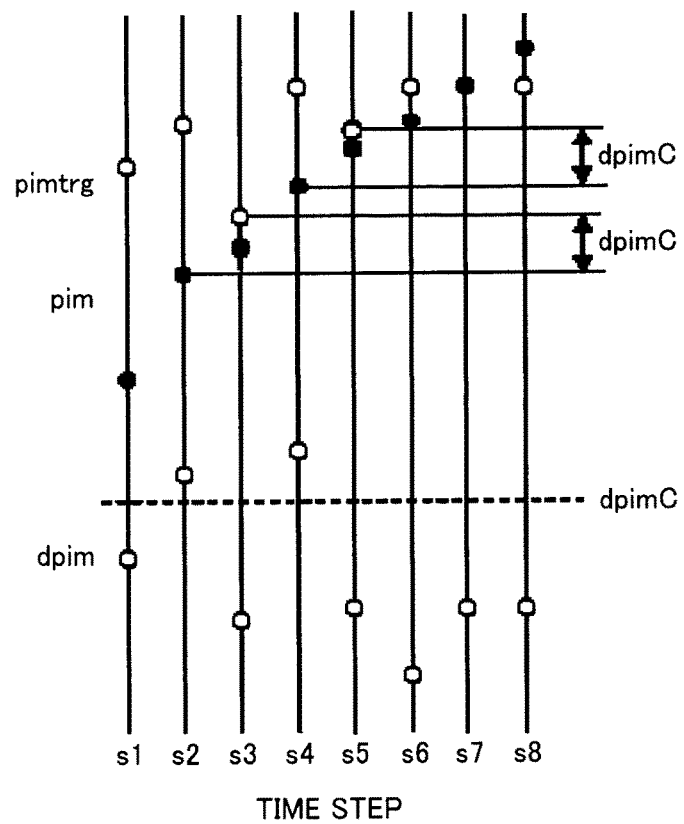
FIG. 11 is a view that shows the controlled results shown in FIG. 10 in detail.

In contrast to this, in the controlled result (B), when the supercharging pressure change rate "dpim" becomes larger than the supercharging pressure change rate reference "dpimC", the FB control target value "pimtrg" is changed to a value obtained by adding the supercharging pressure change rate reference "dpimC" to the actual supercharging pressure "pim". FIG. 11 shows variations in the FB control target value "pimtrg" and the actual supercharging pressure "pim" for each time step and a variation in the supercharging pressure change rate "dpim" for each time step in detail at this time. In FIG. 11, in time step s2, the supercharging pressure change rate "dpim" exceeds the supercharging pressure change rate reference "dpimC". Therefore, in the next time step s3, the FB control target value "pimtrg" is changed to the transitional target value, that is, a value obtained by adding the supercharging pressure change rate reference "dpimC" to the actual supercharging pressure "pim" in the last time step s2. Thus, an increase in the actual supercharging pressure "pim" in time step s3 is suppressed, and the supercharging pressure change rate "dpim" becomes smaller than the supercharging pressure change rate reference "dpimC". Because the supercharging pressure change rate "dpim" is smaller than the supercharging pressure change rate reference "dpimC", the FB control target value "pimtrg" in the next time step s4 is returned to the steady target value that is calculated from the engine rotation speed and the fuel injection amount. However, because the supercharging pressure change rate "dpim" in the time step s4 exceeds the supercharging pressure change rate reference "dpimC" again, the FB control target value "pimtrg" is changed again in the next time step s5 to the transitional target value, that is, a value obtained by adding the supercharging pressure change rate reference "dpimC" to the actual supercharging pressure "pim" in the last time step s4. Thus, an increase in the actual supercharging pressure "pim" in time step s5 is suppressed, and the supercharging pressure change rate "dpim" becomes smaller than the supercharging pressure change rate reference "dpimC" again. In this way, the FB control target value "pimtrg" is changed to the transitional target value each time the supercharging pressure change rate "dpim" exceeds the supercharging pressure change rate reference "dpimC". Thus, a further increase in the supercharging pressure change rate "dpim" is avoided. Thus, even during acceleration in which the supercharging pressure increases, generation of intake sound that makes an occupant feel discomfort is prevented. Although description with reference to the drawing is omitted, a similar effect to that during acceleration may be obtained during deceleration.

Figure 12:
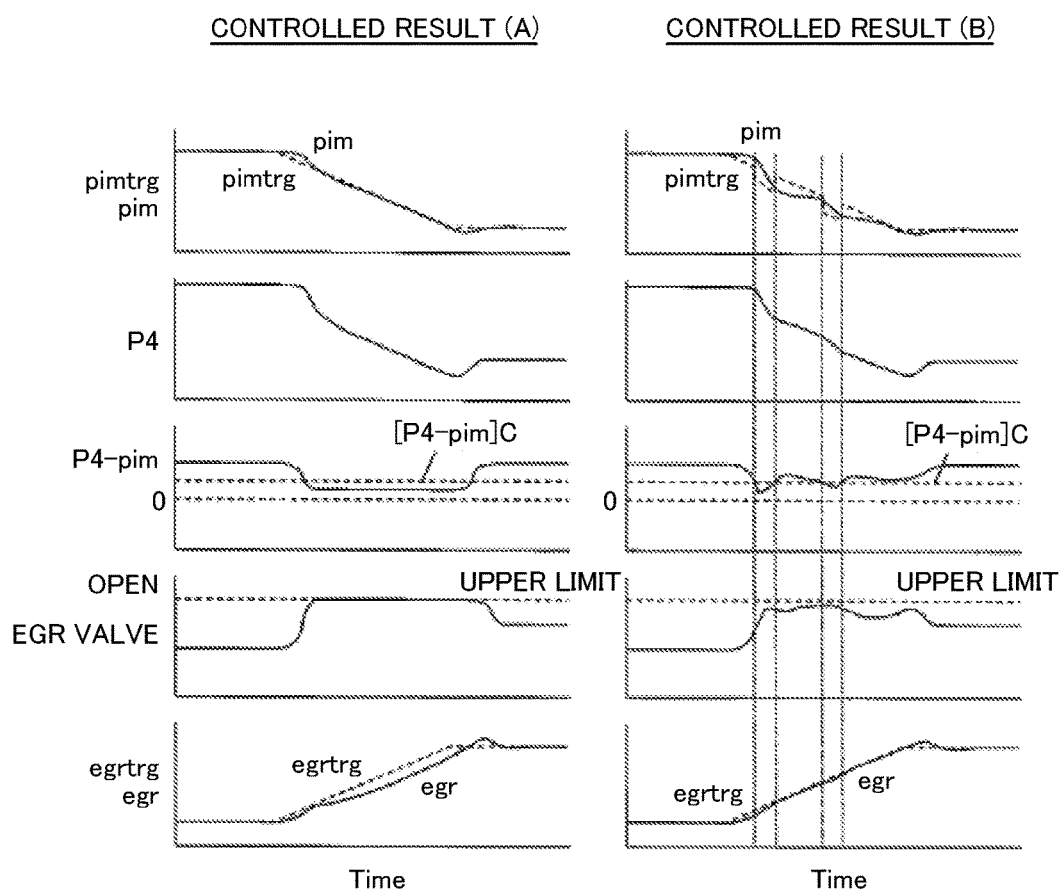
FIG. 12 is a view that shows results controlled by the control device according to the embodiment of the invention.

FIG. 12 is a view for illustrating the effect in the case where the transitional target value "pimtrgk3" is determined as the FB control target value "pimtrg". FIG. 12 shows two controlled results for the supercharging pressure control during deceleration. The controlled result (A) is the result of the supercharging pressure control by constantly using only the steady target value, that is, the controlled result in the case where the transitional target value is not set. On the other hand, the controlled result (B) is the controlled result in the case where the transitional target value is set through the supercharging pressure control according to the present embodiment. The first chart from the top of each controlled result shows a temporal variation in the FB control target value "pimtrg" of the supercharging pressure and a temporal variation in the actual supercharging pressure "pim". The dashed line indicates a temporal variation in the FB control target value "pimtrg". The continuous line indicates a temporal variation in the actual supercharging pressure "pim". The second chart shows a temporal variation in the actual exhaust pressure "P4". The third chart shows a temporal variation in the actual exhaust pressure "P4" and a temporal variation in the actual supercharging pressure "pim". The fourth chart shows a temporal variation in the opening degree of the EGR valve 32. The fifth chart shows a temporal variation in the target EGR rate "egrtrg" and a temporal variation in the actual EGR rate "egr". The dashed line indicates a temporal variation in the target EGR rate "egrtrg", and the continuous line indicates a temporal variation in the actual EGR rate "egr".

Initially, when the controlled result (A) is observed, the FB control target value "pimtrg" is decreased at a constant rate of change. The actual supercharging pressure "pim" decreases so as to follow that. The actual exhaust pressure "P4" decreases with a decrease in the actual supercharging pressure "pim". A decrease in the FB control target value "pimtrg" is carried out in correspondence with a reduction in the fuel injection amount during deceleration, and a decrease in the actual supercharging pressure "pim" is achieved by supercharging pressure feedback control. A decrease in the actual exhaust pressure "P4" is achieved by opening the variable nozzle 18 through a reduction in the fuel injection amount and supercharging pressure feedback control. In the controlled result (A), a differential pressure between the actual supercharging pressure "pim" and the actual exhaust pressure "P4" reduces in process of a decrease in both of them, and a state where the differential pressure is smaller than the above-described differential pressure reference "[P4−pim]C" continues for a while. Because the differential pressure is driving force for recirculating exhaust gas, the EGR valve 32 is fully opened in order to ensure the EGR amount to the maximum in a situation that the driving force is small. However, when the differential pressure is too small, exhaust gas does not flow toward the intake side so much even when the EGR valve 32 is fully opened. Therefore, while the EGR valve 32 is fully opened, a state where the actual EGR rate "egr" is insufficient for the target EGR rate "egrtrg" continues.

In contrast to this, in the controlled result (B), when the differential pressure between the actual exhaust pressure "P4" and the actual supercharging pressure "pim" becomes smaller than the differential pressure reference "[P4−pim] C", the FB control target value "pimtrgk" is changed to the transitional target value obtained by subtracting the differential pressure reference "[P4−pim]C" from the actual exhaust pressure "P4". That is, it is changed to a value at which the supercharging pressure that guarantees the controllability of the EGR rate under the current actual exhaust pressure "P4" is obtained. When the FB control target value "pimtrgk" is changed to the transitional target value in this way, a decrease in the actual supercharging pressure "pim" is facilitated. At this time, the actual exhaust pressure "P4" also decreases at the same time, and its variation amount is smaller than a variation amount in the actual supercharging pressure "pim". Thus, the differential pressure between the actual exhaust pressure "P4" and the actual supercharging pressure "pim" expands, and recovers to a value that exceeds the differential pressure reference "[P4−pim]C" again. When the differential pressure exceeds the differential pressure reference "[P4−pim]C", the EGR valve 32 is not fully opened, and the actual EGR rate "egr" is allowed to match with the target EGR rate "egrtrg" by adjusting the opening degree of the EGR valve 32. That is, the controllability of the EGR rate is guaranteed.

As described above, with supercharging pressure control that is executed in the present embodiment, various constraints associated with the supercharging pressure control are satisfied even during transitional operation. In addition to such an advantage in terms of control, there is also an advantage in the process of creating a control program. With a method of changing the target value of feedback control like the supercharging pressure control according to the present embodiment, it is not required to, for example, minutely adjust the gain of feedback control or switch the control method, so the functions of feedback control are not complicated. It is not necessary to carry out adaptation work of enormous man-hours for each transitional operation condition. In addition, when a new constraint associated with the supercharging pressure control is intended to be added, it is just required to create a sub-routine for calculating a transitional target value associated with the constraint and to change part of the sub-routine for determining a final target value such that the transitional target value calculated in that sub-routine can also be selected on the basis of the priority. Thus, it is easy to add a new constraint or change the contents of the constraints.

Incidentally, the invention is not limited to the above-described embodiment; various modifications may be implemented without departing from the purport of the invention. For example, it may be modified in the following forms.

The transitional target value for a reliability guarantee on hardware should be a value lower than the steady target value. When the condition of step S211 is satisfied in the sub-routine shown in FIG. 4, a certain effect may be obtained only by simply decreasing the target value of feedback control. However, preferably, as in the case of the above-described embodiment, the transitional target value is set to the same value as the actual supercharging pressure in order to keep the current supercharging state.

The transitional target value for preventing generation of intake sound just needs to be a value at which the magnitude of a difference from the actual supercharging pressure is smaller than the magnitude of a difference between the steady target value and the actual supercharging pressure. When the supercharging pressure change rate exceeds the supercharging pressure change rate reference in one time step, it is possible to suppress a further increase in the supercharging pressure change rate if a difference between the FB control target value and the actual supercharging pressure in the next time step can be made at least smaller than the difference in the current time step. However, preferably, as in the case of the above-described embodiment, a value obtained by adding the supercharging pressure change rate reference to the actual supercharging pressure is set as the transitional target value in the case where the supercharging pressure change rate is a positive value, and a value obtained by subtracting the supercharging pressure change rate reference from the actual supercharging pressure is set as the transitional target value in the case where the supercharging pressure change rate is a negative value. With this configuration, it is possible to suppress a rapid increase or decrease in the actual supercharging pressure while reliably increasing or decreasing the actual supercharging pressure.

A differential pressure between the transitional target value for guaranteeing the controllability of the EGR rate and the actual exhaust pressure may be a value larger than the differential pressure reference. That is, the differential pressure between the actual exhaust pressure and the actual supercharging pressure just needs to be recovered to a value larger than or equal to the differential pressure reference by significantly decreasing the supercharging pressure. As long as the differential pressure larger than or equal to the differential pressure reference is at least ensured, it is possible to prevent a decrease in the controllability of the EGR rate during transitional operation.

The actuator for supercharging pressure control may be a waistgate valve other than the variable nozzle. However, the waistgate valve in that case is desirably able to change the opening degree continuously or in multiple steps.

DESCRIPTION OF REFERENCE NUMERALS

2 engine body
4 intake manifold
6 exhaust manifold
8 injector
10 intake passage
12 exhaust passage
14 compressor
16 turbine
18 variable nozzle
30 EGR passage
32 EGR valve
50 ECU
52 rotation speed sensor
54 supercharging pressure sensor
56 exhaust pressure sensor
58 air flow meter
60 intake air temperature sensor
62 accelerator operation amount sensor

What is claimed is:

1. A control device for a turbocharged diesel engine of which a supercharging pressure is actively controllable through operation of an actuator, comprising:
    an engine control unit (ECU) for operating the actuator in accordance with a predetermined control program by processing signals from a plurality of sensors provided in the diesel engine, the ECU configured to:
    determine an actual supercharging pressure of the engine from a signal of a supercharging pressure sensor;
    determine a steady target value that is a target value of the supercharging pressure during steady operation on the basis of an engine rotation speed and a fuel injection amount;
    operate the actuator through feedback control such that the actual supercharging pressure follows the steady target value;
    when at least one condition of a plurality of different conditions is satisfied during transitional operation, the ECU is configured to calculate a transitional target value that is a target value of the supercharging pressure, suitable for the satisfied condition in accordance with a calculation rule prepared for each condition, wherein the plurality of conditions include a condition associated with an exhaust pressure and an exhaust pressure change rate, a condition associated with a supercharging pressure change rate, and the plurality of conditions further include a condition associated with a differential pressure between the exhaust pressure and the supercharging pressure, the engine control unit further configured to:
    determine a priority order among the plurality of conditions on the basis of a value of a rate of change of the fuel injection amount;

select the transitional target value, and, when there are a plurality of conditions satisfied at the same time and a plurality of transitional target values, selecting one of the transitional target values in accordance with the determined priority order; and change a target value of the feedback control from the steady target value to the selected transitional target value determined by priority order to operate the actuator.

2. The control device according to claim 1, wherein the exhaust gas pressure is measured by an exhaust gas sensor of the plurality of sensors.

* * * * *